3,123,575
PROCESS FOR THE PREPARATION OF A CLAY CRACKING CATALYST
William A. Stover, Ellicott City, and Warren S. Briggs, Silver Spring, Md., assignors to W. R. Grace & Co., New York, N.Y., a corporation of Connecticut
No Drawing. Filed Aug. 29, 1961, Ser. No. 134,577
4 Claims. (Cl. 252—450)

This invention relates to the preparation of a clay cracking catalyst with improved cracking performance.

Activated clays have been used in preparing cracking catalysts for 25 years. During World War II the demand for higher octane number gasoline and more throughput in the refineries led to the development of a synthetic catalyst. Since World War II and up to about 5 years ago, the synthetic manufacturers sold about 80–90% of the cracking catalysts used in the United States. Over the past five years, however, the petroleum industry has been gradually substituting clay catalysts for synthetic catalysts. This change has come about through the improvement of cheaper clay cracking catalysts.

It has been known that a number of factors determine the ability of a catalyst to perform. Among these are the pore volume of the catalyst, pore diameter, and the overall surface area, all of which are quantities measurable by physical means. However, it is only fairly recently that means have been established to improve the catalyst properties, that is the activity of the catalyst. One of the earliest, and still principally used methods of activation of natural clays is to treat the clay with varying amounts of acid. When the clay, composed essentially of silica and alumina, along with traces of other metallic compounds such as iron oxide, is exposed to acid the acid serves to dissolve the alumina and other metallic components. It was later found that when a mixture of clay and acid solution was ammoniated, the alumina was re-precipitated on the surface of the silica. The result is an improved catalyst.

However, although the catalysts used to date are effective, there is still much room for improvement. Our invention relates to a novel process for the preparation of clay catalysts wherein the clay is treated with sodium carbonate, prior to treatment with acid and sodium silicate is added to the acidified mixture.

We have found that the more gelatinous the preparation upon activation with acid, the more active the catalyst, for example, compositions used to prepare synethetic catalysts from sodium silicate and aluminum sulfate are the most gelatinous due to the presence of highly hydrated silica and give the best catalysts. Thus, the procedure for making cracking catalysts from clay should contain a step that yields large quantities of highly hydrated silica.

In the process of our invention, raw clay is mixed in an intensifier blender or any other suitable mixing device with sodium carbonate $Na_2CO_3 \cdot H_2O$. The sodium carbonate can be present in the range of about 30–80% by weight of the dry clay, preferably in the range of 40–50%. The mixture is mulled to an extrudable paste, calcined at a temperature of about 800–1400° F. for about 1 to 2 hours, preferably at 1400° F. for about 1 hour, after which it is crushed, ground, and slurried in water. Concentrated sulfuric acid (98% $H_2SO_4$) is added to give an acid concentration of about 3–15% by weight, preferably about 5%, and an acid dosage of from 45–130 weight percent, preferably 70–100 weight percent. The mixture is heated to a temperature in the range of 180–210° F. for about 1 to 2 hours, cooled to below 100° F., and neutralized. Sodium silicate $Na_2O(SiO_2)_{3.3}$ is added to increase the amount of highly hydrated silica present in the mixture. The silica should be present in the amount of 10 to 50 percent by weight, preferably about 20% by weight. The slurry is then neutralized with ammonia; the ammonia should be added to bring the pH to about 5–10, preferably to about a pH of 8.5. The slurry is filtered to remove the major part of the soluble salts prior to drying, reslurried in water, refiltered and dried at about 160–230° F. The dried filter cake is base exchanged with a suitable aqueous solution, preferably containing about 3% ammonium sulfate solution $(NH_4)_2SO_4$ and 1% by weight $NH_4OH$. The dried solids are then washed, redried, and pilled.

Sulfuric acid was used in the development of these catalysts. Other strong mineral acids such as hydrochloric, nitric, etc. give comparable results.

Kaolin or halloysite can be used as a starting material, preferably these materials should not contain more than 0.5% $Fe_2O_3$. Low iron is preferred since it cannot be removed economically during catalyst preparation and clay cracking catalysts high in iron are non-selective and produce too much coke and gas. Kaolin is preferred because it is plentiful and cheap. A commeracial ground air-floated kaolin was used in some of the development of our clay soda ash process. The crude product is preferred.

A commercial grade soda ash $Na_2CO_3 \cdot H_2O$ was used in developing our method. From a handling standpoint, the hydrated form is preferred because it does not pick up appreciable amounts of water from the air. Some difference was noted in the catalytic properties when soda ash with different states of hydration was used. The major part of this difference was attributable to better mixing with the hydrate.

The sodium compound used in the first step of this process must be one that decomposes on heating to release the sodium ion for reaction with the clay. Sodium chloride, sodium sulfate, and sodium hydroxide were substituted for soda ash. Catalysts made with sodium chloride and sodium sulfate were inactive. Here soda was fixed in the structure but did not release highly hydrated silica during the subsequent acid treatment. The catalysts made with sodium hydroxide had a fair steam stability, however, they contained about twice the amount of sodium oxide as was present in the catalysts made with soda ash.

Sodium sulfite $(Na_2SO_3)$ or sodium acid sulfite $(NaHSO_3)$ reacted in the same manner as soda ash, however, because of the difficulty in handling sulfur dioxide $(SO_2)$ fumes commercially, these compounds are not considered as desirable as the carbonates.

The silicate used may be any of the commercial sodium silicates available on the market. The sodium silicate known as the "N brand type" which has the empirical formula $Na_2O(SiO_2)_{3.3}$ is the preferred reagent for addition of silica to the catalyst.

The D+L activity test is used to determine the ability of catalysts to crack gas oil under refinery conditions. The D+L activity is expressed as volume percent of 400° F. end point gasoline produced in a liquid product from the cracking reaction. The larger the D+L number, the better the activity. The gas and coke produced during the operation were also measured. These are expressed as the gas producing factor GPF and a carbon producing factor CPF. The GPF and the CPF indicate the selectivity of the catalysts. Here the smaller the GPF and the CPF numbers the better the selectivity.

In commercial operation, the cracking catalysts are heated to high temperature during the air regeneration cycle. Thus, a procedure was developed by industry to check the relative thermal stability of commercial and experimental cracking catalysts. This procedure involved treatment of the catalysts at various temperatures prior to checking the activity through the D+L test. Here pretreatment is carried out in the air for periods of 3 hours at 1250°, 1550°, 1650°, 1700° and 1750° F.

In commercial operation, cracking catalysts are subjected to a high temperature steam purge between the cracking and air regeneration cycles. To simulate refinery conditions, a process was developed to check the relative steam stability of catalysts. In this procedure the catalyst is subjected to 60 p.s.i.g. steam at 1050° F. for 24 hours. The commercial 13% alumina–87% silica synthetic catalysts have a steam D+L of 30–31 and a 25% alumina–75% silica synthetic catalysts have a steam D+L of 35–36.

The physical properties of the catalysts were also determined. The surface area, pore volume, and pore diameter were determined by the well-known Brunauer Emmett Teller nitrogen adsorption method.

The invention is set out in the following specific but non-limiting examples.

EXAMPLE I

The effect of soda ash on the properties of the final catalyst was demonstrated in a series of runs in which the soda ash was varied from 0.16 to 0.53 pound of soda ash per pound of dry clay.

In each of these runs, 322 grams of dry clay and varying amounts of sodium carbonate (50, 135, and 170 grams respectively) were mixed dry for 1 hour in an intensifier blender. The mixture was mulled to an extrudable paste with water, and calcined. The dry material was ground to give a product that would pass through a 60 mesh screen and then treated with 235 grams of 95% sulfuric acid diluted with 4281 grams to give a 5% sulfuric acid solution. This amount of sulfuric acid is equivalent to 70% of the weight of the dry clay. The mixture was heated to 210° F. for 2 hours and cooled to room temperature. A quantity of sodium silicate was added equivalent to 20% $SiO_2$ based on the weight of the clay. The mixture was gelled by adding ammonium hydroxide to bring the pH to 8.5. The product was filtered to remove the solids and the filter cake was charged to the dryer. The filter cake was dried for 16 hours at 160° F. and ground to a fineness that would pass through a 24 mesh screen. The dry product was base exchanged with a solution of 3% ammonium sulfate containing 1% ammonium hydroxide and washed three additional times with 600 ml. of deionized water. The material was redried at 230° F. and pilled into 3/16 by 3/16 inch pills and heated an additional four hours at 1250° F. to remove the pilling aid and to fix the structure. The results of these runs are shown in Table I below:

*Table I*

| Soda Ash in weight percent | 16 | 42 | 53. |
|---|---|---|---|
| Calcination time and temperature | 4 hrs. at 1,250° F. | 2 hrs. at 1,350° F. | 4 hrs. at 1,250° F. |
| D+L Activity: | | | |
| 1,250° F. Thermal | 43 | 49 | 49. |
| 1,050° F. Steam | 29 | 30 | 33. |
| Properties at 1,250° F.: | | | |
| Surface Area, m.²/g | 150 | 182 | 188. |
| Pore Volume, cc./g | 0.51 | 0.26 | 0.40. |
| Chemical Analysis (Percent by weight): | | | |
| $Al_2O_3$ | 34.0 | 34.0 | 34.0. |
| $Na_2O$ | 0.80 | 1.00 | 0.70. |

It is apparent from a review of the data set out in Table I that the increase in the soda ash used in the preparation of the catalyst from 16 to 53% improves the activity of the catalyst, the surface area, and the pore volume. Using our technique, we have achieved a very unexpected result that the thermal and steam stability are well within the range of an effective catalyst even though the sodium oxide content of our catalyst is in the range of 0.7 to 1% or in the order of 10 times the concentration previously considered maximum.

EXAMPLE II

The outstanding properties of the catalyst prepared according to the process of our invention was shown in a series of runs in which our catalyst was compared to a commercial clay catalyst. In the first of these comparative runs, a catalyst was prepared using a soda ash dosage of 16 weight percent. In the preparation of these catalysts, 322 grams (dry basis) of clay and 50 grams of sodium carbonate ($Na_2CO_3.H_2O$) were mixed dry in an intensifier blender for 1 hour. The mixture was mulled to an extrudable paste with water and calcined for 2 hours at 1350° F. The product was ground to give a product that would pass through a 60 mesh screen, and treated with 235 grams of 96% sulfuric acid in 4227 grams of water to give a 5% sulfuric acid solution. This amount of sulfuric acid is equivalent to 70% of the weight of the dry clay. The mixture set to a gel and the gel was heated to 210° F. for a period of 2 hours. The mixture was cooled and about 230–250 grams (28–29% $SiO_2$) of sodium silicate was added to give the equivalent of 20% $SiO_2$ based on the weight of the clay. The mixture was then treated with ammonium hydroxide to bring the pH up to the point 8.5. The solids were removed by filtration and the filter cake was charged to a dryer. The filter cake was dried for 16 hours at 160° F. and ground to a fineness that would allow the material to pass through a 24 mesh screen. The dried powder was base exchanged with a solution of 3% ammonium sulfate containing 1% ammonium hydroxide and washed three times with 600 ml. of deionized water. The material was redried at 230° F. and pilled into 3/16 by 3/16 inch pills. The pills were heated in the air for 4 hours at 1250° F. to remove the pilling aid and to fix the structure. A comparison of the catalyst in which 16% sodium carbonate was used to prepare the product with the commercial clay catalyst is set out below in Table II:

*Table II*

| | Commercial Clay Catalysts | | Catalyst Prepared Using 16% $Na_2CO_3.H_2O$ | |
|---|---|---|---|---|
| | I | II | I | II |
| D+L Activity: | | | | |
| 1,250° F. Thermal | 31 | 35 | 41 | 43 |
| 1,050° F. Steam | 32 | 29 | 26 | 29 |
| Chemical Analysis: | | | | |
| $Al_2O_3$ | 41 | 48 | 34 | 34 |

EXAMPLE III

The effect of varying the amount of soda ash on the properties of the catalyst as compared with a commercial clay catalyst was evaluated in a run in which the clay was treated with 42 weight percent soda ash.

In this run the conditions and the method of preparing the catalyst was kept constant with the exception that the soda ash was increased. A total of 135 grams of $Na_2CO_3.H_2O$ was used to treat 322 grams of clay. The mixture was calcined for 2 hours at 1350° F. The subsequent steps in the process were the same. The clay was treated with 5% sulfuric acid in an amount equal to a 70% acid dosage and was treated in a later step with sufficient sodium silicate (about 230–250 grams) to give a weight equivalent to 20% of the $SiO_2$ in the clay. The results of this run as compared with a commercial clay catalyst are shown in Table III below:

*Table III*

|  | Commercial Clay Catalysts | | Catalyst Prepared by Treatment with 42 g. soda ash/100 g. clay |
|---|---|---|---|
|  | I | II |  |
| D+L Activity: | | | |
| 1,250° F. Thermal | 31 | 35 | 49 |
| 1,050° F. Steam | 32 | 29 | 30 |
| Chemical Analysis: | | | |
| Al₂O₃ | 41 | 48 | 34 |

EXAMPLE IV

The effect of increasing soda ash dosage to 53 grams of soda ash per 100 grams of clay in runs in which the product prepared under these conditions was compared with a commercial clay catalyst.

In each of these runs, the process was essentially the same as the process described in Examples I and II except that the sodium carbonate was increased to 53 grams of sodium carbonate per 100 grams of clay. The clay (322 grams) was treated with 170 grams of $Na_2CO_3 \cdot H_2O$. The clay-sodium carbonate mixture was calcined for 4 hours at 1250° F. and treated with a quantity of 5% sulfuric acid equivalent to 70% acid dosage. The mixture was heated as before and after cooling a quantity of sodium silicate was added equivalent to 20 grams of $SiO_2$ per 100 grams of clay. The other steps were the same as in Examples I and II. The results of this series are set out in Table IV below:

*Table IV*

|  | Commercial Clay Catalysts | | Catalyst Prepared by Treatment with 52 g. of soda Ash/100 g. clay | |
|---|---|---|---|---|
|  | I | II | I | II |
| D+L Activity: | | | | |
| 1,250° F. Thermal | 31 | 35 | 49 | 46 |
| 1,050° F. Steam | 32 | 29 | 32 | 33 |
| Chemical Analysis: | | | | |
| Al₂O₃ | 41 | 48 | 34 | 34 |

It is apparent from an examination of the data presented in Tables II, III and IV that the commercial clay catalyst does not compare favorably with the catalyst prepared according to our process where the clay is treated with 16 grams, 42 grams, and 52 grams of soda ash per 100 grams of clay, respectively. In each of these examples the 1250° F. thermal D+L of our product is considerably higher than in the commercial product. It should be noted that steam D+L compares favorably with the steam D+L of the commercial catalyst, especially where the clay was treated with 42 and 52 grams of soda ash per 100 grams of clay. The process of our invention also is of special value for preparing catalysts where the amount of alumina desired is lower than the 40–48% alumina present in the commercial clay catalysts.

EXAMPLE V

It is frequently important in the course of operation of plants for the treatment of hydrocarbons that a catalyst be available that has an alumina content below about 40–48% alumina. The process of our invention clearly supplies such a need. The magnitude of the reduction of alumina by using the sodium silicate step in the process was demonstrated in a series of runs in which the catalyst prepared by the sodium silicate process was compared with a catalyst prepared by the soda ash and acid treatment of clay but without the addition of sodium silicate.

In both of these runs the clay was present in a quantity of 53 pounds of sodium carbonate per 100 pounds of clay. In the run in which the catalyst was prepared without the use of sodium silicate, a total of 322 grams (dry basis) of clay and 170 grams of sodium carbonate ($Na_2CO_3 \cdot H_2O$) were mixed dry for 1 hour in an intensifier blender. The mixture was mulled to an extrudable paste with water and calcined for 2 hours at 1350° F. The dry material was ground to give a product that would pass through a 60 mesh sieve and treated with 273 grams of 96% sulfuric acid and 4227 grams of water. This quantity of acid gave an acid concentration of 5% sulfuric acid and is equivalent to an acid dosage of 70% by weight of the dry clay. After the acid treatment, the mixture was gelled by adding concentrated ammonium hydroxide to a pH of 8.5. The solids were removed by filtration and were charged to a dryer. The filter cake was then dried for 16 hours at 160° F. and ground to a fineness that would allow the material to pass through a 20 mesh screen. The dry powder was base exchanged with a solution of 3% ammonium sulfate containing 1% ammonium hydroxide and washed three additional times with 600 ml. of deionized water. The material was redried at 230° F. and pilled into 3⁄16 by 3⁄16 inch pills and heated in air for four hours at 1250° F. to remove the pilling aid and fix the structure.

In the runs in which the sodium silicate was used, the process was essentially the same as the process described in Example I with the exception that 170 grams of sodium carbonate were used to treat 322 grams of clay thus giving a soda ash dosage of 53 grams of soda ash per 100 grams of clay. The other steps in the process were as those set out in Example I. The soda ash mixture was calcined for 4 hours at 1250° F. The mixture was treated with 235 grams of 96% sulfuric acid in 4082 grams of water which is equivalent to an acid dosage of 70%. The 230 grams of sodium silicate was added as in Example I in a quantity sufficient to give 20% of the weight of clay as $SiO_2$. The other steps in the process were the same. The data are shown in Table V below:

*Table V*

|  | Catalyst Prepared by Soda Ash-Acid Process | Catalyst Prepared by Soda Ash-Acid-Silicate Process | |
|---|---|---|---|
|  |  | I | II |
| D+L Activity: | | | |
| 1,050° F. Steam | 34.4 | 32.2 | 33.9 |
| GPF | 1.4 | 1.3 | 1.4 |
| CPF | 1.0 | 1.3 | 1.3 |
| Density g./cc. | 0.62 | 0.74 | 0.77 |
| Properties at 1,250° F.: | | | |
| Surface Area, m.²/g | 176 | 173 | 188 |
| Pore Volume, cc./g | 0.54 | 0.34 | 0.40 |
| Chemical Analysis in percent by weight: | | | |
| Al₂O₃ | 43.1 | 34.2 | 33.9 |
| Na₂O | 1.4 | 0.7 | 0.74 |
| SO₄ | 0.1 | 0.9 | 0.35 |
| TiO₂ | 1.8 | 1.2 | 1.42 |
| Fe₂O₃ | 0.4 | 0.31 | 0.29 |

It is apparent from an examination of the data presented in Table V that the process in which the silicate is added gives a catalyst with the alumina content below 35 weight percent alumina. This process is an excellent process for preparing cracking catalysts from clay where it is important to reduce the alumina content. The properties of the catalyst are essentially the same as the catalyst prepared by the soda ash-acid process. The steam activity, the gas producing factor, carbon producing factor, and the density of the product are comparable.

Obviously many modifications and variations of the invention as hereinabove set forth may be applied without departing from the essence and scope of this invention thereof and only such limitations should be applied as are indicated in the appended claims.

What is claimed is:

1. A process for preparing cracking catalysts from clay which comprises:
    (a) mixing a clay selected from the group consisting of a kaolin and halloysite with from 30 to 80 percent, by weight of the clay, of a sodium compound, capable of decomposing on heating to release sodium ions for reaction with the clay to form a sodium-alumina-silica complex, selected from the group consisting of sodium carbonate, sodium hydroxide, sodium sulfite, and sodium acid sulfite,
    (b) calcining the sodium-alumina-silica complex at a temperature of about 800 to 1400° F. for about 1 to 4 hours,
    (c) adding from 45 to 130 weight percent, based on the dry clay, of a strong mineral acid to the complex to give an acid concentration of from 3 to 15 weight percent, thereby dissolving a portion of the alumina present in the clay,
    (d) adding sodium silicate to said complex in a quantity sufficient to provide about 10 to 50 percent by weight of silica in the complex,
    (e) reprecipitating the solubilized alumina with ammonia,
    (f) filtering and drying the resulting slurry,
    (g) removing sodium from the dried complex by base exchange with a 3% by weight solution of ammonium sulfate containing 1% by weight of ammonium hydroxide, and
    (h) subsequently washing, redrying, and recovering the catalyst product.

2. The process of claim 1 wherein the clay is mixed with from 40 to 50 weight percent of sodium carbonate.

3. The process of claim 2 in which the strong mineral acid is sulfuric acid.

4. The process of claim 3 wherein the soluble alumina is reprecipitated by the addition of a quantity of ammonium hydroxide sufficient to increase the slurry pH to about 8.5.

References Cited in the file of this patent
UNITED STATES PATENTS

| | | |
|---|---|---|
| 1,916,902 | Wilbur | July 4, 1933 |
| 2,485,626 | Mills | Oct. 25, 1949 |